United States Patent
Lindemann et al.

(10) Patent No.: US 7,282,188 B2
(45) Date of Patent: Oct. 16, 2007

(54) METHOD AND DEVICE FOR PRODUCING A METAL HYDROXIDE

(75) Inventors: Johannes Lindemann, Rheinbreitbach (DE); Karl Manderscheid, Hurth-Fischenich (DE); Manfred Schneider, Saarlouis (DE)

(73) Assignee: IMB + Frings Watersystems GmbH (DE)

( * ) Notice: Subject to any disclaimer, the term of this patent is extended or adjusted under 35 U.S.C. 154(b) by 172 days.

(21) Appl. No.: 10/509,206

(22) PCT Filed: Mar. 19, 2003

(86) PCT No.: PCT/EP03/02859

§ 371 (c)(1),
(2), (4) Date: Feb. 24, 2005

(87) PCT Pub. No.: WO03/080512

PCT Pub. Date: Oct. 2, 2003

(65) Prior Publication Data

US 2005/0127001 A1    Jun. 16, 2005

(30) Foreign Application Priority Data

Mar. 25, 2002   (DE) ................................ 102 13 310

(51) Int. Cl.
*C01F 1/00* (2006.01)

(52) U.S. Cl. ...................... 423/155; 423/158; 423/164; 210/650; 210/651; 210/333.01; 210/333.1; 210/335

(58) Field of Classification Search ................ 423/155, 423/158, 164; 210/650, 651, 333.01, 333.1, 210/335; 422/129, 187

See application file for complete search history.

(56) References Cited

U.S. PATENT DOCUMENTS

| | | | | |
|---|---|---|---|---|
| 3,787,558 A | * | 1/1974 | Briggs et al. | ................ 423/164 |
| 3,819,803 A | * | 6/1974 | Tabata et al. | ................ 423/160 |

(Continued)

FOREIGN PATENT DOCUMENTS

DE     198 29 592 C1    12/1999

(Continued)

OTHER PUBLICATIONS

Benoit Fradin et al. "Crossflow microfiltration of magnesium hydroxide suspensions: determination of critical fluxes, measurement and modelling of fouling" Separation and Purification Tech., vol. 16, Issue 1, Jun. 10, 1999, pp. 25-45.*

*Primary Examiner*—Timothy C. Vanoy
(74) *Attorney, Agent, or Firm*—Hoffmann & Baron, LLP

(57) ABSTRACT

The invention concerns a method and an apparatus for producing a metal hydroxide, in particular magnesium hydroxide, from a salt solution, wherein the metal is firstly precipitated from the salt solution and the suspension produced in that way is then filtered. The object of the invention is to provide a method and an apparatus which permit simple inexpensive and rapid production of metal hydroxide, in particular magnesium hydroxide, in a high state of purity. According to the invention that is achieved in that the suspension is filtered through at least one filter (13-17) of a cross-flow filtration installation (13-17), and that a permeate produced by filtration of the suspension is fed to the cross-flow filtration installation (14-17) again.

19 Claims, 2 Drawing Sheets

U.S. PATENT DOCUMENTS

| | | |
|---|---|---|
| 4,014,787 A | 3/1977 | Shorr |
| 4,229,423 A * | 10/1980 | Housh et al. ............... 423/164 |
| 4,865,744 A * | 9/1989 | Hartling et al. ............ 210/651 |
| 5,385,671 A * | 1/1995 | Talbot et al. ............... 210/636 |

FOREIGN PATENT DOCUMENTS

| | | | |
|---|---|---|---|
| DE | 100 33 478 A1 | 6/2001 | |
| DE | 100 01 493 A1 * | 7/2001 | |
| EP | 0 596 712 A1 | 5/1994 | |
| JP | 59-199504 A | 11/1984 | |
| JP | 63-097289 | 4/1988 | |
| SU | 829577 | 5/1981 | |

\* cited by examiner

METHOD AND DEVICE FOR PRODUCING A METAL HYDROXIDE

The invention concerns a method and an apparatus for producing a metal hydroxide, in particular magnesium hydroxide, as set forth in the classifying portions of claim 1 respectively.

Metal hydroxides are raw materials which are required industrially in many different ways. That applies in particular to magnesium hydroxide which is used for example for cleaning flue gases and in sewage treatment. Pure magnesium hydroxide is employed in particular as an additive for washing agents, as an additive in plastic material processing and as a pharmaceutically active ingredient in stomachic agents.

Metal hydroxides occur in nature in the most widely varying forms. For example magnesium hydroxide occurs as brucite. Hitherto it has been obtained primarily from spent liquors from potassium salt processing or by precipitation from sea water which on average contains about 0.5% magnesium. For that purpose milk of lime is generally added to both liquids, that is to say the liquor or the sea water, whereby magnesium hydroxide is precipitated from the liquids. It is then separated off in filter presses. Similar methods are known for further metal hydroxides.

The known methods suffer from the disadvantage that the operation of separating off the magnesium hydroxide requires large filter surface areas and long filter times because of a greasy deposit in those liquids. That results in long expensive manufacturing methods and costly and expensive structural measures in terms of the production apparatus.

Therefore the object of the present invention is to provide a method and an apparatus for producing a metal hydroxide, which permits simple, inexpensive and rapid production of the metal hydroxide in a high state of purity.

According to the invention that object is characterised by a method of producing a metal hydroxide, having the features of claim 1.

The method according to the invention provides that firstly the metal is precipitated in the form of hydroxide from a salt solution. That gives rise to a suspension. That suspension is then filtered. For that purpose a cross-flow filter technology is used: the salt solution-bearing suspension is filtered through a filter by means of the cross-flow filter procedure. A permeate which is produced upon filtration of the salt solution-bearing suspension is fed to the cross-flow filtration installation again, this preferably involving recycling of the permeate into the cross-flow filtration installation.

The invention is based on the realisation that the particles produced by the precipitation operation are transported predominantly in the core of the flow in the cross-flow filtration procedure by virtue of the turbulent flow conditions which obtain in that situation. The turbulent flow conditions permit dissolved foreign substances to be uniformly washed out. Feeding or recycling the permeate into the cross-flow filtration installation provides for recurrent purification of the metal hydroxide-bearing solution with the permeate which is becoming more and more salt-free so that troublesome foreign substances and impurities in any concentration can be separated from that solution. The metal hydroxide-bearing suspension is thus continuously freed of salts and further substances. In that way it is possible to obtain metal hydroxide in a simple fashion, of very high quality.

In accordance with a first embodiment of the invention the permeate of a filter is fed to at least one other filter of the cross-flow filtration installation. That preferably denotes recycling of the permeate from the one filter to the other filter.

In accordance with a further embodiment of the invention the salt solution-bearing suspension is filtered by means of a membrane filter. Preferably the membrane filter has pores which involve a pore width of up to 30 micrometers. In a particularly preferred embodiment the pore width is between 0.05 and 0.5 micrometer.

Preferably for precipitation of the metal the salt solution is passed to a reaction container in which the metal is precipitated in the form of hydroxide. It is further preferably provided that after filtration a concentrate obtained from the filter is purified for definitively obtaining the metal hydroxide.

A particular embodiment of the method according to the invention provides the following: firstly the salt solution containing the metal is made alkaline in a reaction container. As a result the metal is precipitated in the form of a hydroxide which is present in very finely dispersed form in a suspension which was produced by the precipitation step. The suspension is preferably fed to a working container connected to a cross-flow filtration installation, for example an ultrafiltration or microfiltration installation. A permeate is separated off in that installation, preferably by way of a membrane filter, the permeate being in the form of a metal hydroxide-free salt solution. The permeate is passed to a reverse osmosis unit if the content of dissolved salts is not so high that it cannot be processed by the reverse osmosis unit. The concentrate which is retained by the membrane filter contains a concentrated suspension with metal hydroxide which is preferably passed back into the working container again. Pure water additionally flows to the working container and is used for flushing out further soluble salts. The pure water is preferably taken from the reverse osmosis unit. The concentrate which is produced in the reverse osmosis procedure and which contains in particular the soluble salts is taken off. In other words, it is no longer used for the method according to the invention. The above-described embodiment has the advantage that the suspension containing the metal hydroxide is continuously freed of salts and further substances which are removed as concentrates by way of the reverse osmosis unit.

The above-indicated embodiment is based on the following considerations: by virtue of the strongly turbulent flow conditions specific to cross-flow filtration installations, the filtration procedure acts as a mixing member so as to permit dissolved foreign substances and impurities to be very uniformly washed out. By virtue of the intensive mixing effect, a very small grain is produced in the suspension as the turbulent flow configuration prevents the formation of agglomerates in the suspension and agglomerates which have been formed are broken up. As that avoids stationary 'concentration islands' within a particle agglomerate, that procedure also intensifies and accelerates the effect of flushing out dissolved foreign substances or impurities which in the methods known hitherto last for a very long time. Cyclically increasing the level of particle concentration in the working container and subsequent dilution by the supply of pure water makes it possible to produce any desired quality of purity without additional purification stages having to be integrated for that purpose.

In a further embodiment of the invention the salt solution-bearing suspension is filtered by means of at least two filters, wherein a first filter is connected or arranged upstream of a second filter. Preferably those filters are each arranged in a respective filter stage which are connected in succession.

It is further preferably provided that the permeate which passes through the second filter is passed back to the first filter.

In a further embodiment of the method according to the invention at least one filter or at least one of the filter stages is fed with pure water for flushing out at least one soluble salt from the suspension which is produced upon precipitation of the metal from the salt solution. It is further advantageous for the permeate which leaves the first filter stage or the first filter to be fed to a reverse osmosis unit if—as already described above—the levels of salt concentration allow that. Preferably the pure water obtained by means of the reverse osmosis unit is fed to the second filter or the filter stage. It is further preferably provided that the permeate leaving the filter of the second filter stage is fed to the first filter stage. Preferably connected upstream of the first filter stage there is also a further filter stage with which as much salt solution as possible is removed from the suspension.

All the above-indicated embodiments are based on the principle of extraction in counter-flow relationship. A plurality of cross-flow filtration stages are connected in succession or operated one downstream of the other (that is to say are used a plurality of times one after the other), wherein preferably a salt-free permeate from reverse osmosis flows to the last cross-flow filtration stage. A concentrate which was washed with salt-free permeate then leaves the last cross-flow filtration stage. The permeate of that cross-flow filtration stage, which is now only slightly contaminated with dissolved salts, is then fed to the previous cross-flow filtration stage for washing out the salts which are present there. Connecting a plurality of cross-flow filtration stages in succession makes it possible to produce metal hydroxide in virtually any desired state of purity with that counter-flow procedure. A further advantage is that the amount of pure water required for the purification operation is reduced.

A further embodiment of the method according to the invention provides that precipitation of the metal is effected by milk of lime or caustic soda solution.

The apparatus according to the invention for carrying out in particular the above-described method is characterised by the features of claim 20. It has at least one reaction container or reaction unit for the precipitation of the metal from the salt solution and at least one filter stage which has at least one filter for filtration of the salt solution-bearing suspension obtained by the precipitation operation. A permeate passes through the filter. There is also provided at least one conduit for feeding or recycling the permeate into at least one of the filter stages.

BRIEF DESCRIPTION OF THE DRAWINGS.

Some embodiments of the invention are described in greater detail hereinafter with reference to Figures in which.

DETAILED DESCRIPTION OF THE INVENTION.

Figure 1:
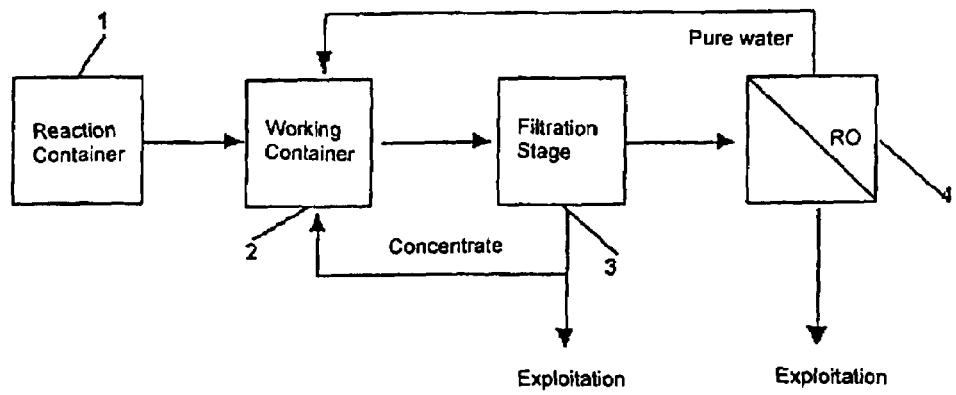
FIG. 1 is a view showing the principle of a first apparatus for carrying out the method, wherein magnesium hydroxide is produced from a concentrate.

FIG. 1 is a view in principle showing a first apparatus according to the invention for carrying out the method according to the invention, in which magnesium hydroxide is produced from a concentrate. The individual structural units are described in greater detail with reference to the description of the method according to the invention.

A magnesium-bearing salt solution is fed to a reaction container 1 in which the solution is made alkaline by the addition of milk of lime or a caustic soda solution. After reaching a pH-value of about 11.5 all the magnesium is precipitated in the form of hydroxide and is present in finely dispersed form in the suspension produced in that way. The suspension is then passed to a working container 2 connected to a filtration stage 3. A permeate is separated off by means of the filtration stage 3. The permeate is a magnesium hydroxide-free solution and it is fed to a reverse osmosis unit 4. The concentrate which is retained by the membrane, unlike the suspension produced in the reaction container, contains a concentrated suspension with magnesium hydroxide which is fed back into the working container 2 again. Pure water additionally flows to the working container 2 and, together with the filtration stage 3, serves to flush out further salts. The pure water is taken from the reverse osmosis unit 4, the concentrate of which is disposed of. After that procedure has been run a plurality of times, the concentrate which is retained by the filtration stage 3 and which only still contains highly pure magnesium hydroxide is discharged.

Figure 2:
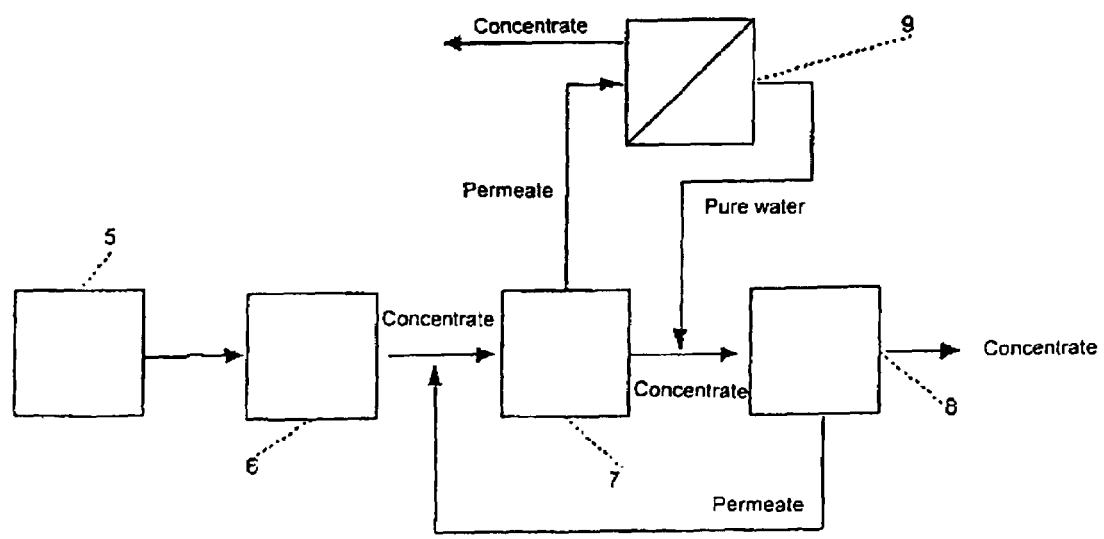
FIG. 2 is a view showing the principle of a second apparatus for carrying out the method, wherein magnesium hydroxide is produced from a concentrate.

A further embodiment by way of example of an apparatus according to the invention for carrying out the method according to the invention in which magnesium hydroxide is produced from a concentrate is shown in FIG. 2. The illustrated apparatus has a plurality of successively connected cross-flow filtration stages 6 to 8 (hereinafter each referred to as a filter stage) which each have a respective membrane filter. The pore width of the membrane filter is here between 0.05 and 0.5 micrometer.

The solution containing the magnesium is mixed with caustic soda solution in a reaction container 5 so that the magnesium precipitates in the form of magnesium hydroxide. Then the suspension produced in that way is fed to a first filter stage 6 with which a pre-filtration operation is effected. The permeate issuing through the membrane filter of the filter stage 6, in the form of water and soluble salts, is carried off into a duct. The concentrate produced from the filter stage 6 is fed to a further filter stage 7. The permeate from that filter stage 7 is fed to a reverse osmosis unit 9. The permeate thereof is highly pure water and is fed to a further filter stage 8. The concentrate from the reverse osmosis unit 9 is discharged into a duct for disposal.

The permeate produced by the filter stage 8 only has small quantities of salts and for the removal of further salts is recycled into the filter stage 7 which is connected upstream of the filter stage 8. The concentrate produced by the filter stage 8 has the highly pure magnesium hydroxide.

Figure 3:
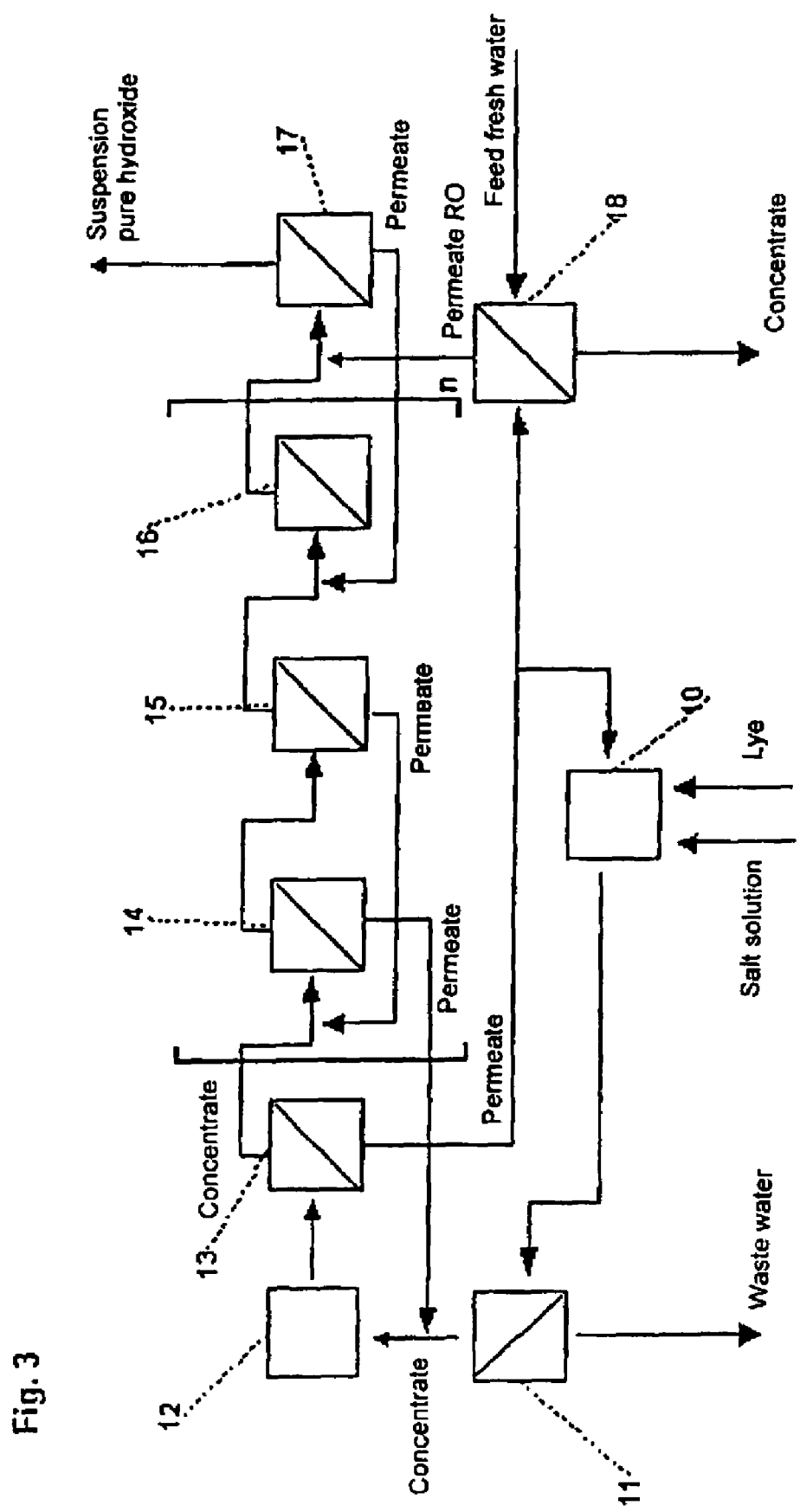
FIG. 3 is a view showing the principle of a third apparatus for carrying out a further method, wherein magnesium hydroxide is produced from a concentrate.

A further embodiment of an apparatus according to the invention which uses the method according to the invention is shown in FIG. 3. Added to a salt solution which is passed into a reaction container 10 and which contains the magnesium is a lye, whereby magnesium hydroxide is precipitated. The salt solution-bearing suspension which is produced as a result is fed to a pre-filtration stage 11 which is connected downstream of the reaction container 10. The concentrate which is produced in the pre-filtration operation is passed to a mixer 12 which is connected downstream of the pre-filtration stage 11 and the function of which will be discussed in greater detail hereinafter. The residual substances which are retained in the pre-filtration operation are passed into the waste water.

From the mixer the suspension passes into a plurality of successively connected filter stages 13 to 17, wherein the concentrate of one filter stage is always passed to the downstream-connected filter stage. The permeate leaving the individual filter stages is recycled into respective different units of the apparatus according to the invention, preferably being recycled into upstream-disposed filter stages. By way of example the permeate of the filter stage 15 is recycled to the filter stage 14 and the permeate of the filter stage 17 is recycled to the filter stage 16. The permeate becomes more and more salt-free at each filter stage. The permeate of the filter stage 14 is fed to the mixer 12 and it is then mixed with the concentrate from the pre-filtration stage 11 in the mixer 12.

The filter stage 17 is fed with the concentrate from the filter stage 16 and the permeate from a reverse osmosis unit 18, which is almost salt-free. The reverse osmosis unit 18 itself is fed either with fresh water or the permeate from the filter stage 13. The concentrate from the filter stage 17 is almost salt-free and contains almost exclusively the highly pure magnesium hydroxide.

The method according to the invention and the apparatus according to the invention have the advantage that the permeate from a filter stage, which is only slightly contaminated with dissolved salts, is recycled to an upstream-connected filter stage for washing out the salts which are present there. The successive connection of a plurality of filter stages provides that metal hydroxide can be produced in virtually any state of purity with that counter-flow procedure. For example the arrangement of filter stages which is illustrated with the large brackets in FIG. 3 can be connected in succession as often as may be desired.

LIST OF REFERENCES 1 reaction container
2 working container
3 filtration stage
4 reverse osmosis unit
5 reaction container
6 filter stage
7 filter stage
8 filter stage
9 reverse osmosis unit
10 reaction container
11 pre-filtration stage
12 mixer
13 filter stage
14 filter stage
15 filter stage
16 filter stage
17 filter stage
18 reverse osmosis unit

The invention claimed is:

1. A method of producing a metal hydroxide from a salt solution, wherein a metal hydroxide is firstly precipitated from the salt solution and the salt solution-bearing suspension produced in that way is then filtered through at least one filter (3, 6-8, 13-17) of a cross-flow filtration installation (3, 6-8, 13-17), characterised in that
a permeate produced by filtration of the suspension is directly fed to the cross-flow filtration installation (3, 7, 14-17) again.

2. A method according to claim 1 characterised in that the permeate from one of the filters (8, 15, 17) is fed to at least one other filter (7, 14, 16) of the cross-flow filtration installation.

3. A method according to claim 1 characterised in that the suspension is filtered by means of a membrane filter.

4. A method according to claim 3 characterised in that the suspension is filtered by means of a membrane filter having pores whose pore width is up to 30 micrometers.

5. A method according to claim 4 characterised in that the suspension is filter by means of a membrane filter having pores whose pore width is between 0.05 and 0.5 micrometer.

6. A method according to claim 1 characterised in that for precipitation of the metal hydroxide the salt solution is fed to a reaction container (1, 5, 10).

7. A method according to claim 1 characterised in that a concentrate filtered from the filter (8, 17) is purified to obtain the metal hydroxide.

8. A method according to claim 1 characterised in that the suspension is filtered by means of at least two filters (6-8, 13-17), wherein a first filter is arranged upstream of a second filter (6-8, 13-17).

9. A method according to claim 8 characterised in that the permeate passing through the second filter (8, 15, 17) is passed back to the first filter (7, 14, 16).

10. A method according to claim 9 characterised in that a concentrate produced at the second filter (8, 15, 17) is purified in a purification unit for obtaining metal hydroxide.

11. A method according to claim 8 characterised in that pure water is fed to at last one of the filters (8) for flushing out at least one soluble salt.

12. A method according to claim 8 characterised in that the permeate passing through the first filter (7) is fed to a reverse osmosis unit (9).

13. A method according to claim 12 characterised in that pure water is obtained by means of the reverse osmosis unit (9) and is fed to the second filter (8).

14. A method according to claim 8 characterised in that the suspension is filtered by means of the first and second filters (3, 6-8, 13-17), wherein the filters (3, 6-8, 13-17) are arranged in a respective filter stage and a first filter stage is arranged upstream of a second filter stage.

15. A method according to claim 14 characterised in that the permeate passing through the filter (8) of the second filter stage is fed to the first filter stage.

16. A method according to claim 14 characterised in that connected upstream of the first filter stage is a further filter stage (6) with which the suspension is subjected to pre-filtration.

17. A method according to claim 16 characterised in that the concentrate from the further filter stage (6) is passed into the first filter stage and that the permeate from the further filter stage (6) is fed to a reverse osmosis unit.

18. A method according to claim 17 characterised in that the permeate from the reverse osmosis unit is passed into a purification unit, the purification unit flushing out at least one soluble salt with the permeate from the reverse osmosis unit.

19. A method according to claim 1 characterised in that precipitation of the metal hydroxide is effected by means of milk of lime or caustic soda solution.

* * * * *

UNITED STATES PATENT AND TRADEMARK OFFICE
CERTIFICATE OF CORRECTION

PATENT NO. : 7,282,188 B2  
APPLICATION NO. : 10/509206  
DATED : October 16, 2007  
INVENTOR(S) : Lindemann et al.

It is certified that error appears in the above-identified patent and that said Letters Patent is hereby corrected as shown below:

Column 6, Claim 5, line 15, replace "in that the suspension is filter by means" with --in that the suspension is filtered by means--;

Column 6, Claim 11, line 34, replace "water is fed to at last" with --water is fed to at least--.

Signed and Sealed this

Eleventh Day of March, 2008

JON W. DUDAS  
*Director of the United States Patent and Trademark Office*